INVENTOR
YUTAKA SONOYAMA
BY: Paul M. Craig, Jr.
ATTORNEY

United States Patent Office 3,321,653
Patented May 23, 1967

3,321,653
ALTERNATING CURRENT ELECTRIC MOTOR ROTOR
Yutaka Sonoyama, Tokyo, Japan, assignor to Hitachi, Ltd., Chiyoda-ku, Tokyo, Japan, a corporation of Japan
Filed Mar. 3, 1964, Ser. No. 349,085
Claims priority, application Japan, Mar. 4, 1963, 38/10,121; Apr. 22, 1963, 38/20,141; Aug. 31, 1963, 38/46,886
4 Claims. (Cl. 310—180)

This invention relates to alternating current electric motors, and more particularly to the manner of constructing the windings thereof.

Electric motors, in general, comprise iron cores having windings thereon, and the work of winding coils on the cores is relatively expensive, as well as, having important significance with regard to the operating characteristics of motors.

The manner of making windings on motor cores are classified, in general, into "lap winding," "wave winding," and "concentric winding," as is well known, and also into "single layer winding" and "double layer winding," according to whether one or two coils are placed in each slot of the core. Among them, double layer lap windings give good characteristics, and have been adopted broadly. However, this method of winding involves many undesirable problems when an automatic winding machine is employed in making the windings directly into the core slots, because of the necessity of providing interlayer insulation, etc.

Automatic winding machines are conveniently used in an easy manner for single layer concentric winding, but the operating characteristics or performances of single-layer concentric-winding motors heretofore have not been the most desirable. In addition, such windings are relatively expensive, resulting in high cost. By concentric windings is meant an arrangement wherein the turns of a coil are located concentrically within one another.

An object of the present invention is to provide a rotor for an alternating current motor of desirable characteristics, having windings adapted to be placed directly and inexpensively into the cores by use of automatic winding machine.

Another object of the present invention is to provide an alternating current motor having windings arrayed in such a manner that the motor possesses improved operating characteristics, and yet allows a greater saving of materials than heretofore.

A still further object of the invention is the provision of a concentric wound rotor for an alternating current motor having the above characteristics.

There are other objects and particularities of the present invention, which will be made obvious from the following detailed description of the invention, with reference to the accompanying drawnigs, in which.

The present invention is based on the discovery of the fact that, if the sum of magneto-motive forces of a pair of N- and S-poles is not changed, there is no lowering in the motor operating characteristics in spite of differences in the effective magneto-motive forces of the N- and S-poles, respectively.

Referring to FIGS. 1 through 4, the motor comprises a laminated core C havings slots 1 to 36. Remaining elements of the motor are not shown in the drawings, since they are of conventional construction and unnecessary to be illustrated.

Figure 1:
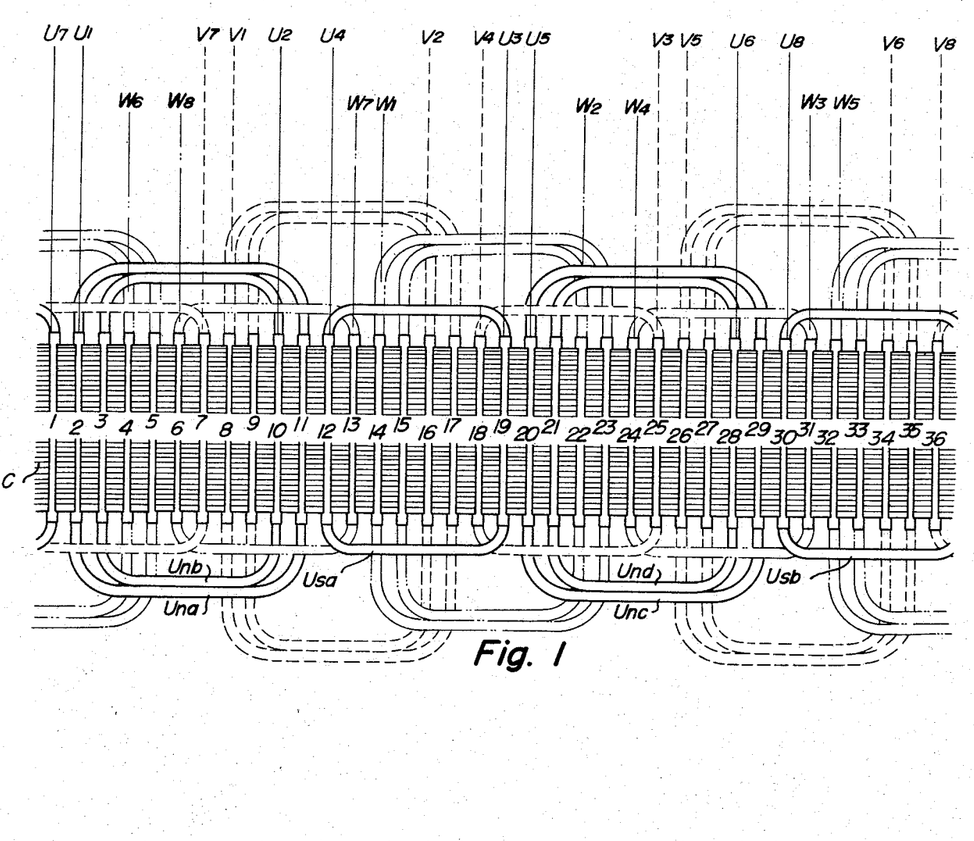
FIG. 1 is an extended view of a winding showing an embodiment of the present invention as applied to a three-phase, four-pole, 36-slot A.C. motor.

According to the present invention, two turns U$na$ and U$nb$ are provided which form a coil comprising one of the poles of a three phase, four pole motor. One turn U$na$ is formed bridging slots 2 and 11, and another turn U$nb$ is formed bridging slots 3 and 10 which are inwardly next to slots 2 and 11, respectively. These two concentrically arranged turns are connected in series to each other, so that their magneto-motive forces are in the same direction. In the slots which are respectively displaced from the above-identified slots by 360 electrical degrees, that is, slots 20 and 29, a turn U$nc$ is placed bridging them, and another turn U$nd$ is placed bridging slots 21 and 28 which are inwardly next to slots 20 and 29, respectively. The two concentrically arranged turns U$nc$ and U$nd$ are connected in series to each other, as in the case of turns U$na$ and U$nb$, and comprise a second coil forming another oppositely disposed pole of the same polarity for the four pole, three phase motor.

Between the above-mentioned two sets of coils, a single turn coil U$sa$ is placed in slots 12 and 19 bridging them, the single turn coil U$sa$ having its center 180 electrical degrees displaced from that of turns U$na$ and U$nc$. Similarly, a single turn coil U$sb$ is placed in slots 30 and 1 bridging them. These intermediate single turns coils U$sa$ and U$sb$ produce magneto-motive forces, respectively, in the opposite direction to those of coils U$na$, U$nb$ and U$nc$, U$nd$. Hence, the coils U$sa$ and U$sb$ comprise the opposite polarity (South) poles of the four pole, three phase motor. It will be obvious that the magnitudes of megneto-motive forces produced by the first-mentioned group of coils and the second-mentioned group of coils are different from each other. As a consequence, as mentioned above, improved operating characteristics of a motor using the rotor thus constructed, are obtained. This result is achieved even while providing a savings in the materials required to fabricate the coils.

The above-mentioned coils are of U-phase, and it will readily be understood that coils of remaining phases V and W are similarly arranged with 120 electrical degrees displaced, respectively. In the drawings, V-phase coils are shown by dotted lines, while W-phase coils are shown by chain lines.

Figure 2:
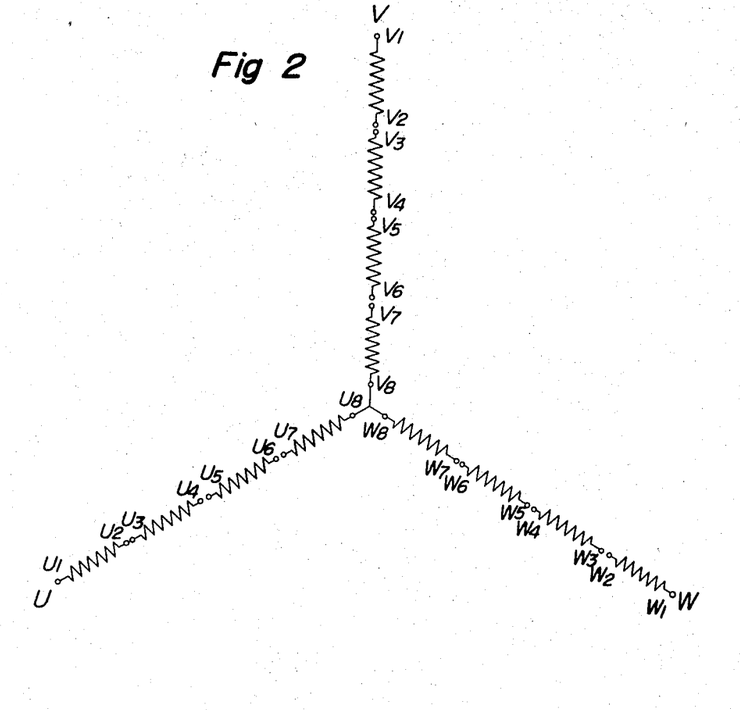
FIG. 2 shows diagrammatically the connections of the coils shown in FIG. 1.
Figure 3:
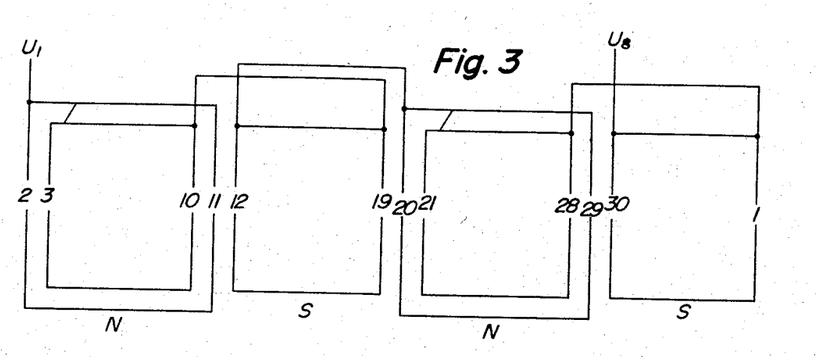
FIG. 3 shows diagrammatically one phase coil of the same.

Each coil is provided with lead wires U$_1$, U$_2$, for example, and lead wires U$_3$, U$_4$ and U$_5$, U$_6$ and U$_7$, U$_8$ for example, are series connected with each other, and this applies also to V-phase and W-phase coils as shown in FIG. 2. Lead wires U$_8$, V$_8$ and W$_8$ are connected together and form a neutral point, while lead wires U$_1$, V$_1$ and W$_1$ are respectively connected to the three phase terminals U, V, W of the motor. The connection of coils of U-phase, for example, is shown in FIG. 3. It will readily be seen that two coils U$na$ and U$nb$ form a N-pole, and two coils U$nc$ and U$nd$ form the opposing N-pole, while the intermediate and opposing coils U$sa$ and U$sb$ form S-poles, respectively.

Figure 4:
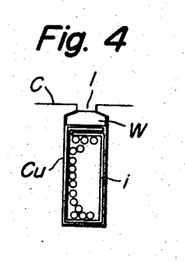
FIG. 4 is a cross-sectional view of one core slot.

FIG. 4 shows the manner of placing coil sides in a core slot. $i$ designates insulating paper of sufficient mechanical and electrical strength, $Cu$ the coil conductors, and $W$ the wedge for closing the slot opening. All the conductors placed in each slot are elements of a single turn. This is one of the main features of the present invention. Further advantages in the present invention will be obvious from the below explanations described in comparison with the conventional coil constructions. If the intermediate single turn coils U$sa$ and U$sb$ would be removed, and another coil would be disposed outside the coils U$na$ and U$nc$, a single-layer concentric winding would be formed, among which is a full-pitch coil that bridges slots 2 and 11. The hypothetical outside single turn coil bridging slots 1 and 12, and the inside turn bridging slots 3 and 10 have the same effect on the fundamental wave of alternating current. Further, the outside coil bridging slots 1 and 12 has various disadvantages, such as larger amount of copper, increased leakage reactance, etc. It has been confirmed both experimentally and theoretically that, according to the present invention, in which the above-mentioned hypothetical outside coil is removed, the leakage impedance is about 10 percent less and the coil resistance is about 15 percent less than a conventional winding which have the above-mentioned hypothetical outside coil, with the magneto-motive force unchanged.

Figure 5:
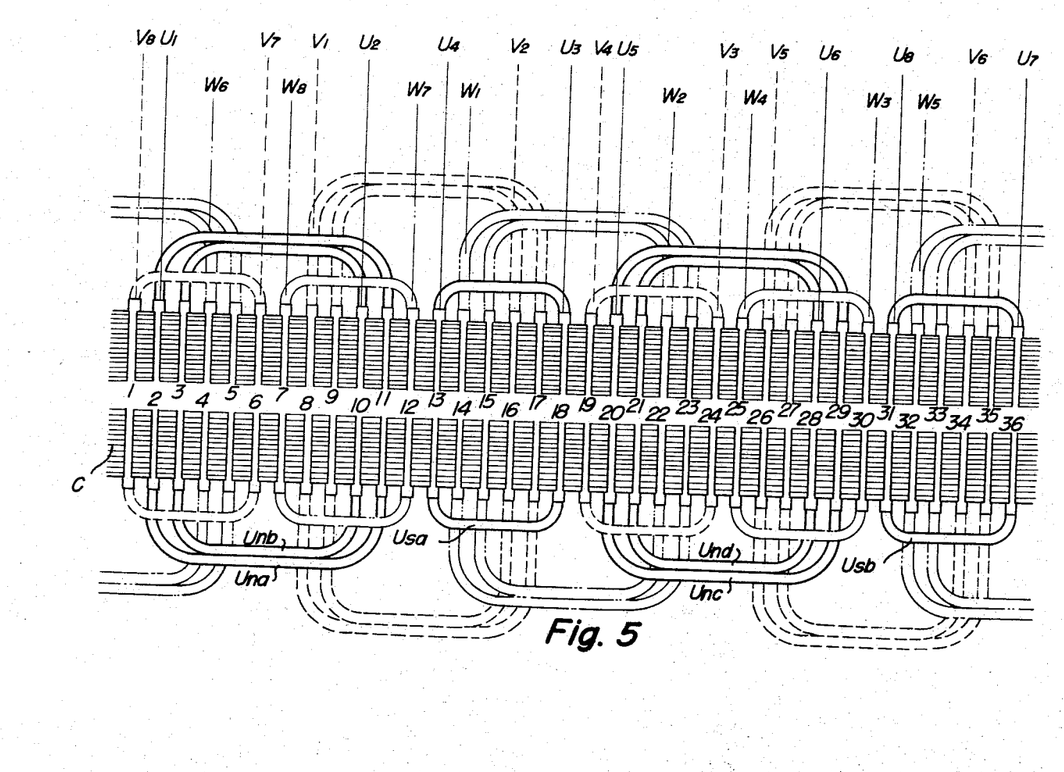
FIGS. 5 and 6 shows respectively modifications of the embodiment shown in FIG. 1.

Referring to FIG. 5, turns U$na$, U$nb$ and U$nc$, U$nd$ are disposed similarly to those shown in FIG. 1, but the intermediate single turn coils U$sa$ and U$sb$ have a pitch different from that of those shown in FIG. 1. Thus, coil U$sa$ bridges slots 12 and 18, and coil U$sb$ bridges slots 31 and 36. The coils of U-phase, V-phase and W-phase are all connected as shown in FIG. 2. In comparison to the embodiment shown in FIG. 1, the pitch of coils U$sa$ and U$sb$ is shortened, and consequently, the portions of coils crossing each other are less, resulting in corresponding advantages.

Figure 6:
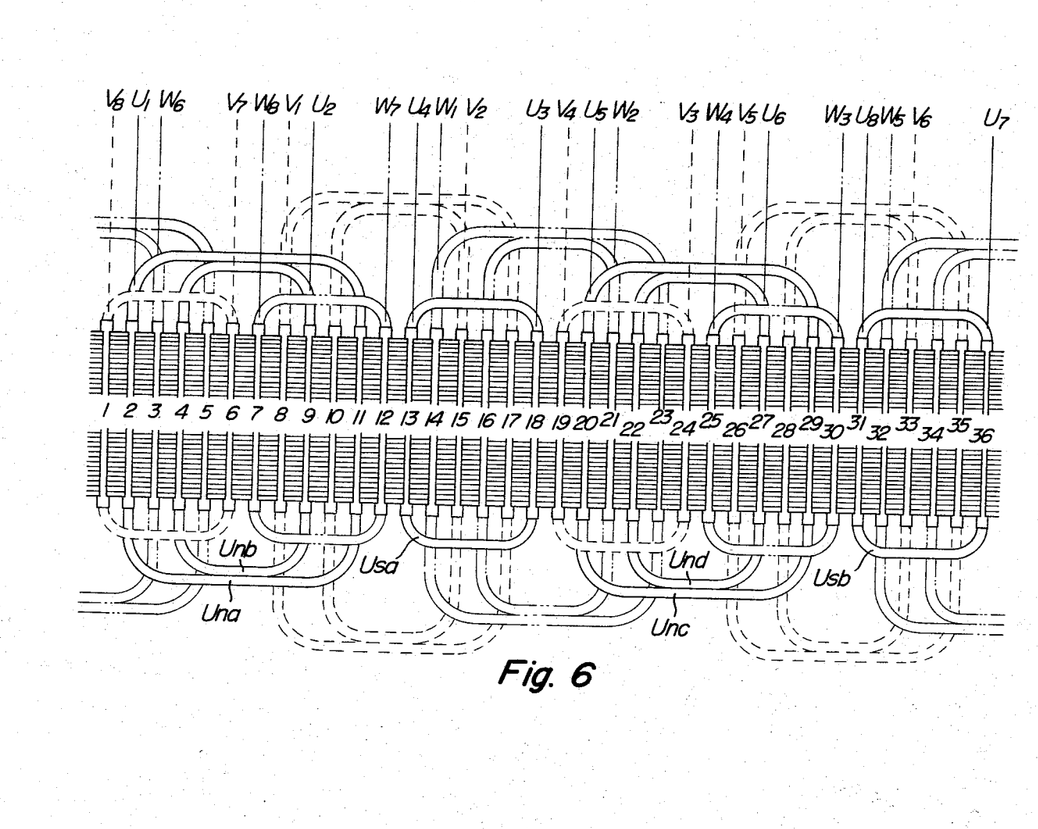

FIG. 6 shows another modification, in which the inner turns U$nb$ and U$nd$ of N-poles bridge slots 4 and 9, and slots 22 and 27, respectively, these slots being positioned inwardly one slot removed from those receiving turns of corresponding outer coils U$na$ and U$nc$. In this modification, the portions of coils crossing each other are further lessened than that shown in FIG. 5.

As is readily understood from the modifications shown in FIGS. 5 and 6, according to the present invention, if the main coils of larger magneto-motive force are not changed, the intermediate coils positioned therebetween may be changed in their pitches within a certain extent. Such free selection of pitches is not possible at all in the conventional single-layer concentric winding construction.

Figure 7:
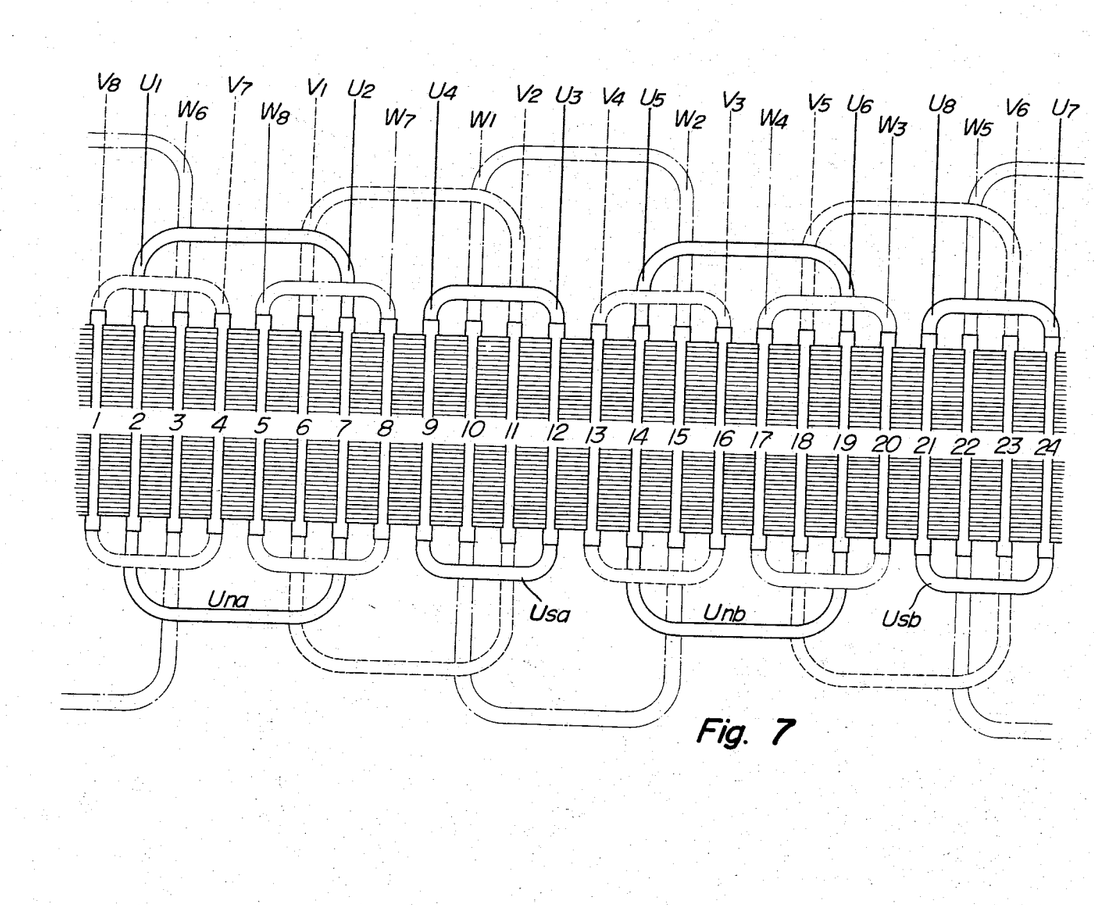
FIG. 7 is an extended view of a winding showing another embodiment of the invention as applied to a three-phase, four-pole, 24-slot A.C. motor.

Referring to FIG. 7, the iron core is provided with 24 slots. As for U-phase only, for example, single turn coil U$na$ bridges slots 2 and 7, and coil U$nb$ bridges slots 14 and 19, 360 electrical degrees displaced from the former. Between these N-pole coils, and displaced 180 electrical degrees from them, S-pole coils U$sa$ and U$sb$ are disposed bridging slots 9 and 12, and slots 21 and 24, respectively. Coils U$na$ and U$nb$, and coils U$sa$ and U$sb$ have different pitches from each other, and consequently, even if the number of conductors forming them is the same, their effective magneto-motive forces are different from each other. The same applies also to V-phase and W-phase windings. All the coils are connected together in a manner similar to FIG. 2.

Figure 8:
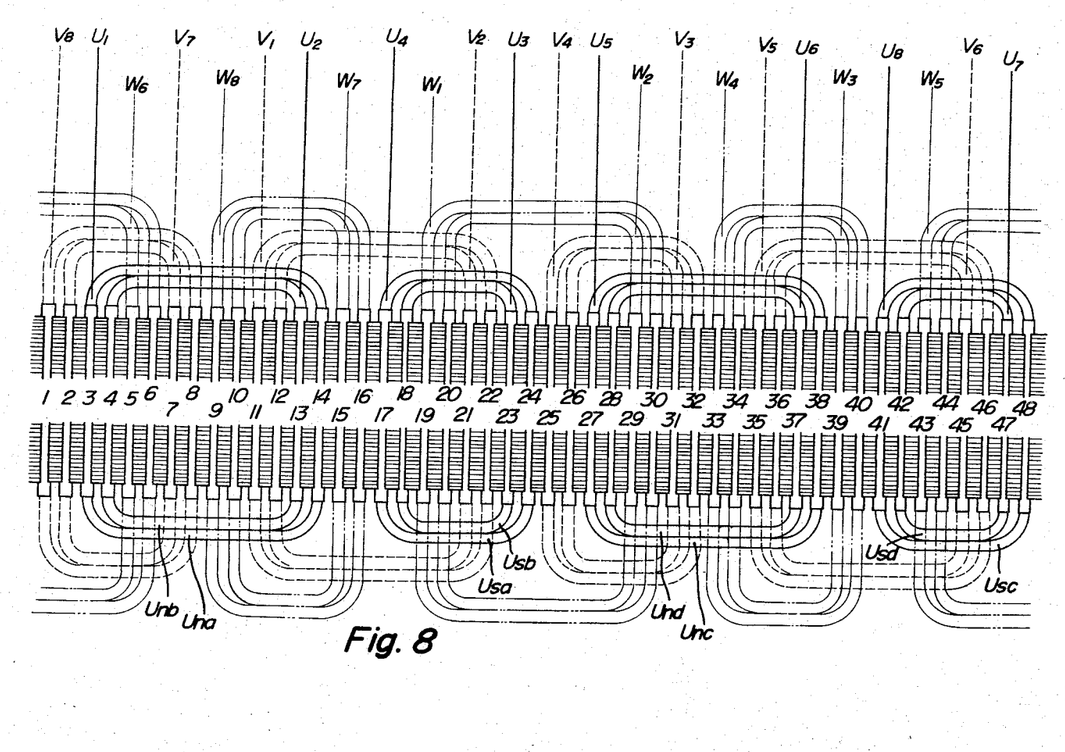
FIGS. 8, 9 and 10 show respectively further embodiment in case of 3-phase, 4-pole, 48-slot A.C. motors.

The embodiment shown in FIG. 8 has an iron core C having 48 slots for three-phase four-pole windings. Turn U$na$ bridges slots 3 and 14, and turn U$nb$ bridges slots 4 and 13, inwardly next to the former slots, respectively. These turns form one coil comprising a pole, say N-pole, as in the preceding embodiments. Displaced from them by 360 electrical degrees, similar turns U$nc$ and U$nd$ of the same pole are arranged bridging slots 27 and 38, and slots 28 and 37, respectively. Between these coils, coils formed by turns U$sa$, U$sb$, and U$sc$, U$sd$ of the other pole are disposed, turn U$sa$ bridging slots 17 and 24, turn U$sb$ bridging slots 18 and 23 inwardly next to slots 17 and 24, respectively, turn U$sc$ bridging slots 41 and 48, 360 electrical degrees displaced from slots 17 and 24, and coil U$sd$ bridging slots 42 and 47, inwardly next to slots 41 and 48, respectively. By virtue of different pitches of coils, the above-mentioned two sets of coils produce different magneto-motive forces, even if the number of turns or conductors of all the coils are the same.

Figure 9:
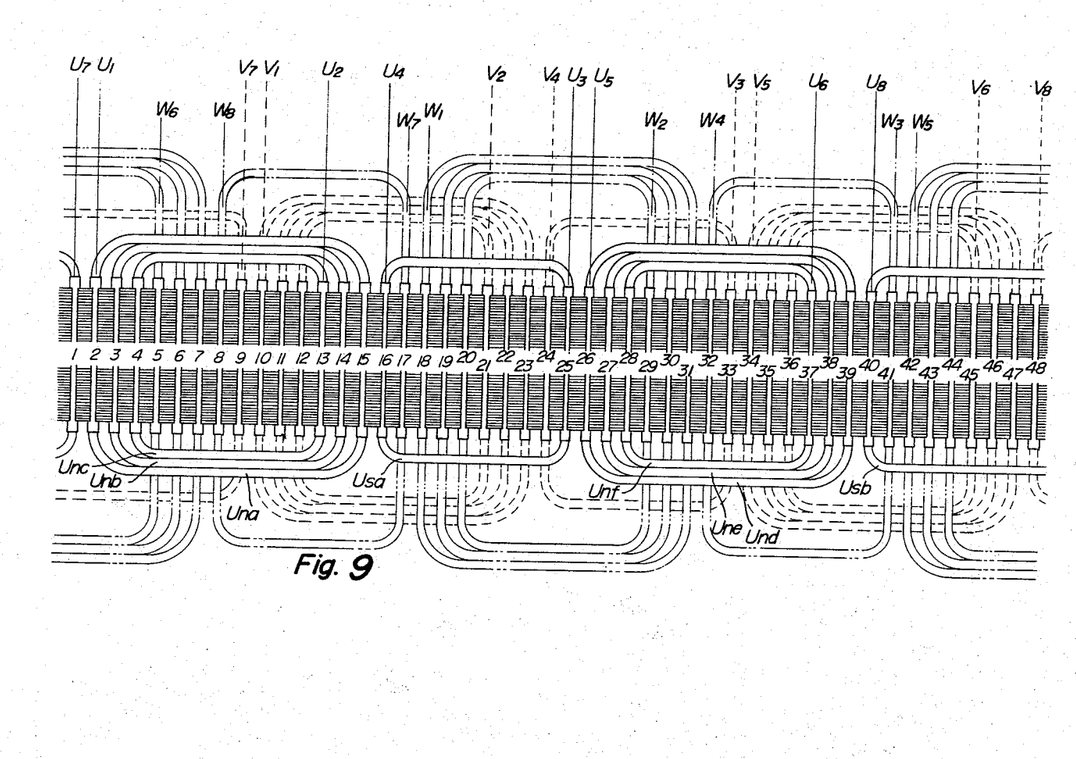

In the modification shown in FIG. 9, the number of turns forming N-pole is different from number of turns forming S-pole. Thus, three concentric turns U$na$, U$nb$ and U$nc$ bridge slots 2 and 15, slots 3 and 14, and slots 4 and 13, respectively, and 360 electrical degrees displaced therefrom three concentric turns U$nd$, U$ne$ and U$nf$ bridge slots 26 and 39, slots 27 and 38, and slots 28 and 37, respectively. Between these two sets of N-pole coils, S-pole single turn coils U$sa$ and U$sb$ are arranged bridging slots 16 and 25, and slots 40 and 1, respectively. The same applies to V-phase and W-phase windings also.

Figure 10:
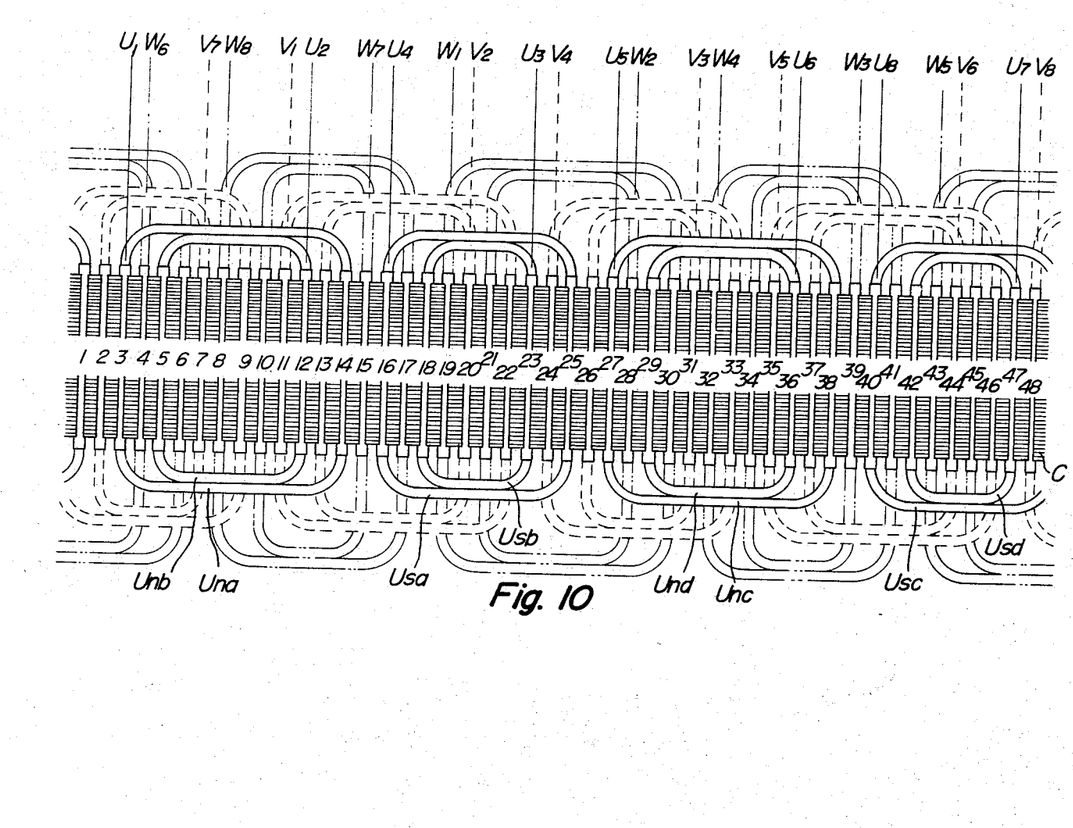

In the modification shown in FIG. 10, each pole comprises two concentric coils. For U-phase, N-pole coil U$na$ bridges slots 3 and 14, and inner coil U$nb$ bridges slots 5 and 12, inwardly one slot removed from slots 3 and 14. 360 electrical degrees displaced therefrom, similar coils U$nc$ and U$nd$ are disposed bridging slots 27 and 38, and slots 29 and 36, respectively. Between these two coil groups, two groups of concentric S-pole two turn coils U$sa$, U$sb$, and U$sc$, U$sd$ are disposed, turn U$sa$ bridging slots 16 and 25, turn U$sb$ bridging slots 18 and 23, turn U$sc$ bridging slots 40 and 1, and turn U$sd$ bridging slots 42 and 47. The same applies also to V-pole and W-pole windings, but with 120 electrical degrees displacement from each other.

Figure 11:
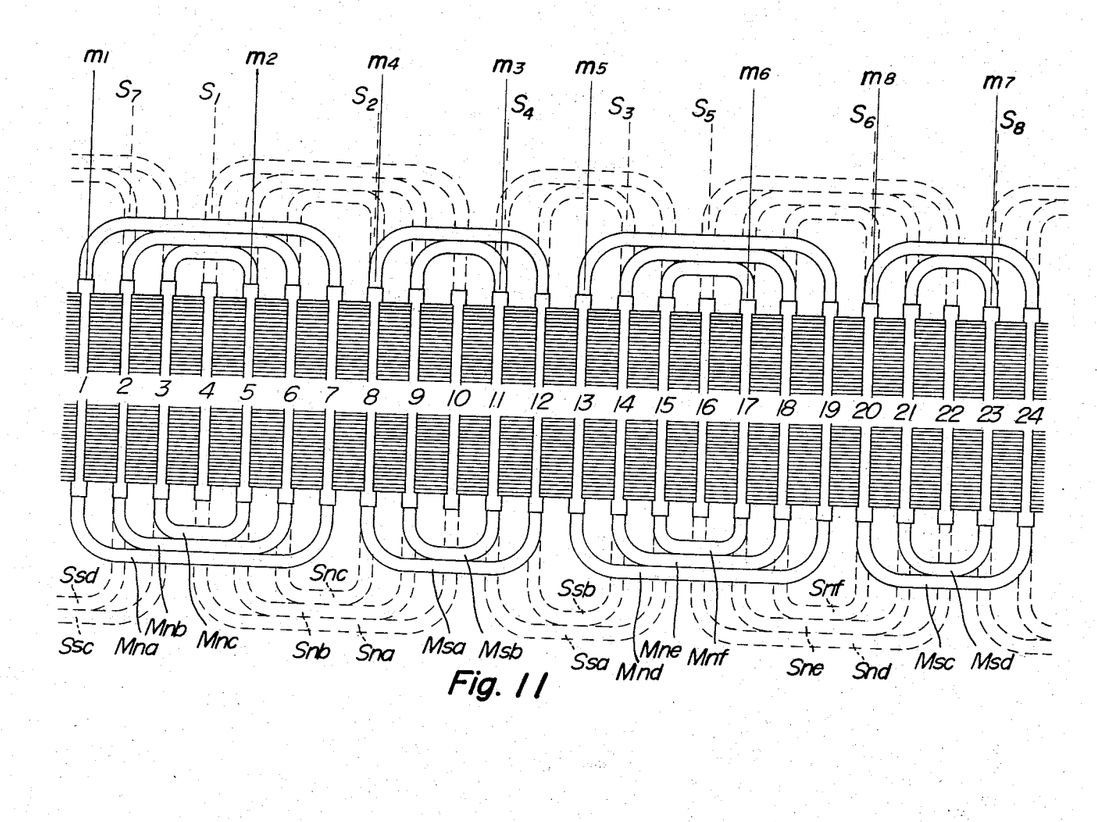
FIG. 11 is an extended view of winding showing a further embodiment of the invention as applied to a single-phase A.C. motor.
Figure 12:
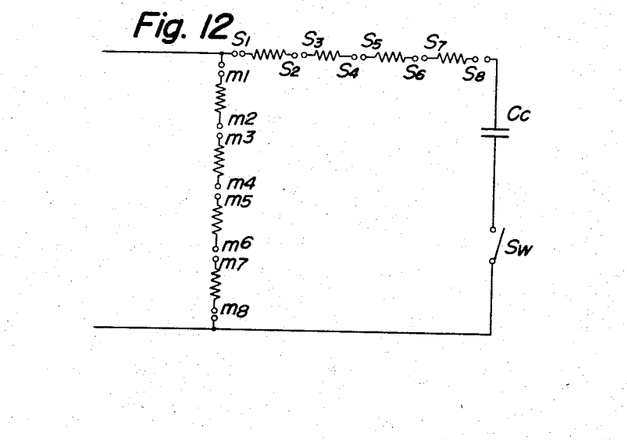
FIG. 12 shows diagrammatically the connection of winding of the single-phase motor shown in FIG. 11.

In FIG. 11, the present invention is illustrated as applied to a single-phase four-pole induction motor. The iron core is provided with 24 slots 1 to 24. A single-phase induction motor comprises, in general, operating coils and starting coils, usually called main coils and auxiliary coils, respectively. With regard to the main coils, one N-pole coil is comprised by turn M$na$ bridging slots 1 and 7, turn M$nb$ bridging slots 2 and 6, inwardly next to slots 1 and 7, respectively, and turn M$nc$ bridging slots 3 and 5, inwardly next to slots 2 and 6, respectively. 360 electrical degrees displaced from the above-mentioned coil, a similar opposite disposed N-pole coil is comprised by turns M$nd$, M$ne$ and M$nf$ arranged, bridging slots 13 and 19, 14 and 18, and 15 and 17, respectively. Between the above-mentioned two coils comprised by turns, two sets of concentric S-pole coils M$sa$, M$sb$, and M$sc$, M$sd$ are disposed, bridging slots 8 and 12, slots 9 and 11, slots 20 and 24, and slots 21 and 23, respectively. Displaced from the above-mentioned main coils by 90 electrical degrees, auxiliary coils are arranged in the same manner as the main coils, and all the coils are connected together as shown in FIG. 12. The main coils having terminals $m_1$, $m_2$, $m_3$, $m_4$, $m_5$, $m_6$, $m_7$, $m_8$ are connected together in series relation, with opposite end terminals $m_1$ and $m_8$ connected to single-phase supply terminals U and V. The auxiliary coils having terminals $S_1$ to $S_8$ are connected together in series relation, with opposite end terminals $S_1$ and $S_8$ connected to the supply terminals through a capacitor C and a switch S$w$.

In single-phase A.C. motors, in order to improve the wave forms among coils formed by concentric windings, full-pitch coils have a number of turns more than other coils. In general, the ratio of number of turns of the full-pitch coil to the other is 2 to 1. In the present invention, the ratio of number of turns of coils M$na$, M$nb$, M$nd$, M$ne$, and M$sa$, M$sc$ to number of turns of inside coils M$nc$, M$nf$, and M$sb$, M$sd$ is 2 to 1. The same applies to the auxiliary coils.

With the above construction, slots 1, 7, 13 and 19 are respectively occupied fully by single turns, and slots 4, 10, 16 and 22 are fully occupied respectively by single turns of the auxiliary winding. Slots 2, 6, 8, 12, 18, 20 and 24, are each occupied by two main turns and one auxiliary turn, while slots 3, 5, 9, 11, 15, 17, 21, and 23, are each occupied by two auxiliary turns and one main turn. Consequently, all the slots receive substantially equal amounts of copper, respectively, and have substantially uniform space factors.

What is claimed is:

1. A stator for an A.C. motor comprising a stator core having a plurality of slots and first and second type coils corresponding in number to a predetermined number of poles and circularly disposed one after another in alternate arrangement with the same distance between the electrical centers of said first and second type coils in the circumferential direction of said stator body, said first and second type coils mutually adjacent to each other being provided to be 180 electrical degrees offset therebetween to produce opposite polarities from each other, said first type coil being wound in said slots with a certain slot pitch which is shorter than that of said second type coil, and said first coil producing an effective magneto-motive force smaller than that of said second type coil.

2. A stator according to claim 1 in which said first and second type coils are respectively composed of a plurality of unit turns concentrically wound with respect to the electrical center thereof, the outermost unit turn of first type coil being wound with a certain slot pitch which is shorter than that of the outermost unit turn of said second type coil.

3. A stator according to claim 1 in which said second type coil is wound in the slots with an approximately full pitch which is determined in accordance with said predetermined number of poles and the number of slots.

4. A stator according to claim 2 in which said second type coil is wound in the slots with an approximately full pitch which is determined in accordance with said predetermined number of poles and the number of slots.

References Cited by the Examiner

UNITED STATES PATENTS

| | | | |
|---|---|---|---|
| 1,488,873 | 4/1924 | Francis | 310—180 |
| 2,011,114 | 8/1935 | Papin | 310—180 |
| 2,310,131 | 2/1943 | Tofflinger | 310—180 |
| 2,328,497 | 8/1943 | Romine | 310—180 |
| 2,473,257 | 6/1949 | Potter | 310—180 |
| 2,848,680 | 8/1958 | Maggs | 310—185 |
| 3,030,534 | 4/1962 | Hammerstrom et al. | 310—185 |
| 3,235,762 | 2/1966 | Brammerlo | 310—185 |

MILTON O. HIRSHFIELD, *Primary Examiner.*

L. L. SMITH, *Assistant Examiner.*

UNITED STATES PATENT OFFICE

CERTIFICATE OF CORRECTION

Patent No. 3,321,653                          May 23, 1967

Yutaka Sonoyama

It is certified that error appears in the above identified patent and that said Letters Patent are hereby corrected as shown below:

In the heading to the drawings and printed specification, "ALTERNATING CURRENT ELECTRIC MOTOR ROTOR", each occurrence, should read -- ALTERNATING CURRENT ELECTRIC MOTOR STATOR --. Column 1, lines 40 and 51, "rotor", each occurrence, should read -- stator --; lines 53 and 54, "presestn", each occurrence, should read -- present --; line 55, "drawnigs" should read -- drawings --. Column 2, line 49, "rotor" should read -- stator --.

Signed and sealed this 29th day of July 1969.

(SEAL)
Attest:

Edward M. Fletcher, Jr.                     WILLIAM E. SCHUYLER, JR.

Attesting Officer                             Commissioner of Patents